Figure 1:
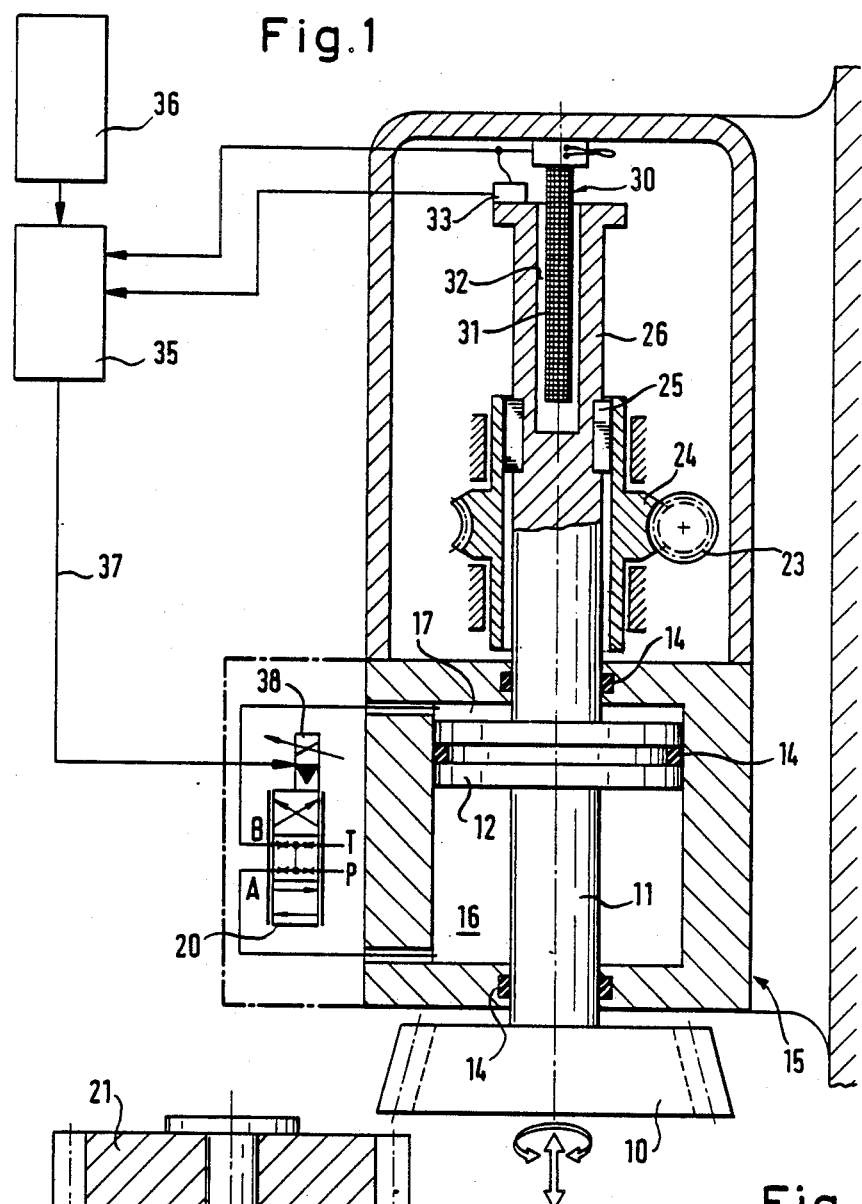

United States Patent [19]

Feuser

[11] Patent Number: 4,786,218
[45] Date of Patent: Nov. 22, 1988

[54] MACHINE TOOL COMPRISING A TOOL DRIVEN IN THE AXIAL DIRECTION BY A HYDRAULIC LIFTING CYLINDER, IN PARTICULAR A GEAR SHAPER MACHINE

[75] Inventor: Alfred Feuser, Lohr-Rodenbach, Fed. Rep. of Germany

[73] Assignee: Mannesmann Rexroth GmbH, Fed. Rep. of Germany

[21] Appl. No.: 823,315

[22] Filed: Jan. 28, 1986

[30] Foreign Application Priority Data

Jan. 30, 1985 [DE] Fed. Rep. of Germany ....... 3503104

[51] Int. Cl.$^4$ .............................................. B23F 5/16
[52] U.S. Cl. .......................................... 409/2; 409/35
[58] Field of Search .................. 408/8, 10, 11, 12, 130; 409/2, 92, 186, 187, 185, 196, 34, 35, 36, 46

[56] References Cited

U.S. PATENT DOCUMENTS 4,136,302  1/1979  Tlaker et al. ...................... 409/34 X
4,329,096  5/1982  Herscovici ........................... 409/15

FOREIGN PATENT DOCUMENTS 635020  3/1983  Switzerland .
499093  5/1976  U.S.S.R. ................... 408/11
602313  3/1978  U.S.S.R. ................... 408/11
693056  10/1979  U.S.S.R. ................... 408/10
906664  2/1982  U.S.S.R. ................... 408/130

Primary Examiner—Z. R. Bilinsky
Attorney, Agent, or Firm—Harness, Dickey & Pierce

[57] ABSTRACT

A machine tool comprising an axially reciprocating tool is driven by a hydraulic jack or lifting cylinder which is controlled by a servovalve. The amplitude and velocity of the lifting cylinder is set at a control circuit to which the position and acceleration of the lifting cylinder are applied as input variables. The electrohydraulic control has a high damping and high gain. As a result the velocity change of the lifting cylinder when the tool enters the workpiece is negligibly small.

10 Claims, 2 Drawing Sheets

MACHINE TOOL COMPRISING A TOOL DRIVEN IN THE AXIAL DIRECTION BY A HYDRAULIC LIFTING CYLINDER, IN PARTICULAR A GEAR SHAPER MACHINE

DESCRIPTION

The invention relates to a machine tool comprising a tool which is driven in the axial direction by a hydraulic lifting cylinder, in particular a gear shaping machine, having the features set forth in the preamble of claim 1.

As a rule, for driving gear shaper machines mechanical lifting drives are provided for the tool. The mechanical drives can only deliver relatively low cutting forces with a short stroke. In addition, the velocity in such drives has a sinusoidal form. This sinusoidal movement can impair the machining quality of the gear.

A mechanical-hydraulic lifting or jack drive is also known for a gear shaper machine (CH-PS No. 625,150). The directional valve for controlling the lifting cylinder is installed in the piston of said cylinder and the slide piston of the directional valve driven by an electromechanical pilot control system which is provided with an eccentric transmission at which the velocity, stroke number and working stroke can be adjusted. The pilot control system is costly and takes up a lot of space and furthermore the setting of the operating parameters at the pilot control system is time consuming and the lifting cylinder in particular when the tool enters the workpiece undergoes relatively great velocity changes.

The problem underlying the invention is thus to construct the drive of the machine tool so that the drive of the tool has as constant as possible a velocity even on impact-like loading and relieving at the ends of the tool to obtain a uniformly good machining quality of the workpiece, and to provide simple means for the drive.

Said problem is solved by the features set forth in the characterizing clause of the claim. Further developments of the invention are characterized in the subsidiary claims.

The hydraulic drive by means of the lifting cylinder or hydraulic jack can apply very high cutting forces at high working speeds. The servovalve driven by a controller and the lifting cylinder give a drive which is constructed in economical space-saving and functionally expedient manner. By means of the electronic control a high damping and thus a high gain of the control circuit can be obtained. As a result, the velocity change when the tool enters the workpiece or when it leaves the workpiece is negligibly small. Furthermore, the piston stroke may be set to a minimum because due to the small acceleration and retardation paths the overrun errors are small. Consequently, the operating frequency of the machine is high.

Instead of the measuring device for detecting the acceleration of the lifting cylinder or hydraulic jack, according to the invention the desired condition parameters can be simulated as input signals for the control unit in an electronic model. This model represents a simulation of the hydraulic control paths consisting of the servovalve and the lifting cylinder. From the actually measured and the position of the lifting cylinder estimated in the model a difference signal is formed which is supplied to a correction circuit which in accordance with the difference signal forms correction signals for reducing the errors of the model. The correction signals generated in the evaluation circuit are sent to the controller.

Figure 2:
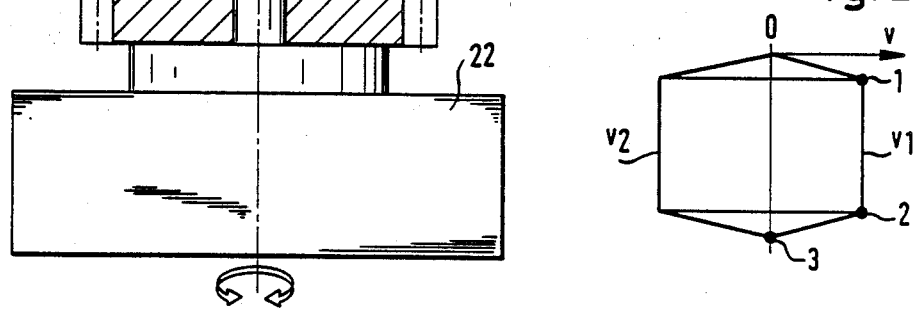
Figure 3:
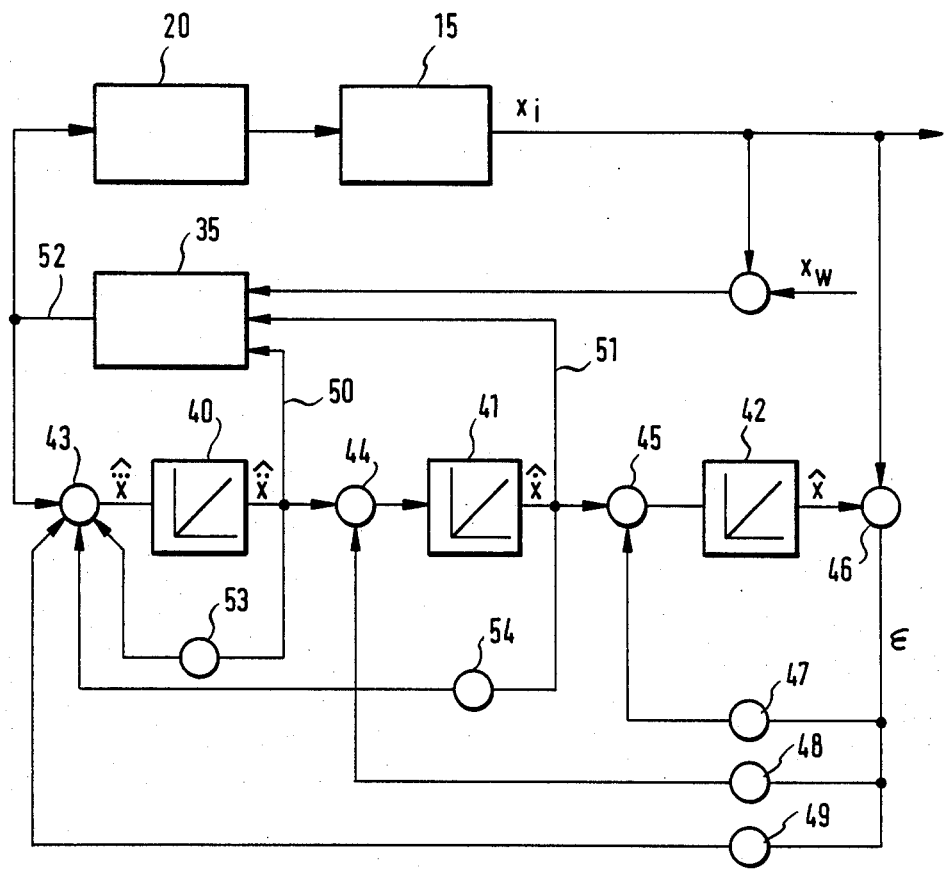

The invention will be explained hereinafter with reference to an example of embodiment. In the drawings:

FIG. 1 is a side view, partially in section, of a lifting or jack drive for a gear shaping machine, FIG. 2 is a velocity profile of the tool and FIG. 3 is a schematic illustration of a control means with model and evaluation circuit.

The hydraulic drive illustrated in FIG. 1 for a gear shaper machine can be used in all cutting machine tools with interrupted cut, for example broaching machines or draw-type keyway cutters.

In FIG. 1 a tool 10 is secured to the piston rod 11 of the piston 12 of a jack or lifting cylinder 15 whose pressure chambers 16 and 17 are connected to a servovalve 20 which is connected to a pressure medium or fluid source P and a reservoir T. Depending on the switching position of the servovalve the pressure chamber 16 is connected to the fluid source and the opposite pressure chamber 16 to the tank so that the tool 10 executes a working stroke whilst in the converse case the tool executes the return stroke.

A workpiece 21 such as a gearwheel is secured to a machine table 22 which is rotatably driven by a drive which is not illustrated. The tool 10 can also be rotatably arranged. The drive is via a sleeve-like gear 24 which meshes with a worm 23 and which via the spring 25 is coupled fixed in rotation but axially displaceably to the extended piston rod 26.

The stroke of the tool 10 or the position of the tool 10 is detected by an inductive travel pickup 30 whose winding 31 is disposed fixed with respect to the housing and projects into a blind bore 32 of the piston rod 26. Furthermore, an acceleration pickup 33 is secured to the piston rod 26. The signals of the travel pickup 30 and of the acceleration pickup 33 are supplied to a controller 35 which is made up as PI controller, i.e. with proportional-integrating ratio. The integration constant is set so that the currents of limit cycles is just avoided. A control electronic system 36 is adapted to enter into the controller as reference parameter the velocity to be executed by the tool 10 in the working stroke and in the return stroke as well as the stroke amplitude. From the reference values and the actual values taken from the lifting cylinder such as the position and acceleration the controller furnishes in known manner on the line 37 a manipulated variable or adjusting variable which is utilized to drive the proportional magnet 38 of the servovalve 20.

FIG. 2 shows a velocity profile where proceeding from the velocity zero in the clockwise direction of the diagram the tool 10 is accelerated to the velocity $V_1$ in the working stroke, the tool entering the workpiece at 1 and leaving the workpiece at 2, whereupon the tool is retarded up to the reversal point 3 and the return stroke then takes place with greater velocity $V_2$. It is apparent from FIG. 2 that the hydraulic drive travels with constant velocity through the workpiece even on impact-like loading and relieving at the ends 1 and 2 of the workpiece 21.

Due to the taking into account of the tool acceleration the hydraulic drive has a high damping and thus a high gain, i.e. a high acceleration and high retardation are achieved without the control path tending to overshoot or become unstable.

By the high acceleration and retardation values it is possible to operate the working stroke with constant velocity so that the surface to be machined is made more uniform. Furthermore, the stroke speed can be considerably increased, for example up to 35 m per minute. By the greater amplification in the control circuit more rapid response of the control and thus a greater accuracy of the proportional controller are obtained whilst due to the integrating behavior of the controller trailing errors are reduced.

Trailing errors of the hydraulic drive, i.e. deviations of the tool from a predetermined starting position due to overflowing of fluid via the piston 12, in particular in the working stroke from the pressure chamber 17 to the chamber 16, are minimized by correspondingly leak-free seals 14. Furthermore, the seals should be made of the low-friction type so as not to impair the regulating behavior of the drive, since the integration constant can be set correspondingly high.

Under the high travelling velocities of the tool the acceleration pickup 33 must meet high dynamic requirements. In addition, the rotating piston represents a major design problem as regards the detection by measurement techniques. The detection by measurement techniques of the acceleration of the drive can be obviated if in accordance with FIG. 3 an electronic model is connected in parallel with the controlled system consisting of the servovalve 20 and the lifting cylinder 15. In FIG. 3 the electronic model consists of three integrating amplifiers 40, 41 and 42 to the inputs of which logic members 43, 44 and 45 are connected. The input signal for the amplifier 40 forms the third derivative $\dddot{x}$ of the position of the tool. The integrating amplifier 40 generates from this input signal a signal $\hat{\ddot{X}}$ representing the estimated acceleration of the tool and the integrating amplifier 41 forms from this signal the signal $\hat{\dot{x}}$ which represents the estimated velocity of the tool and which in the following amplifier 42 is integrated to a signal $\hat{x}$ which represents the estimated position of the tool. The signal $\hat{x}$ of the estimated position is compared in the logic member 46 with the position actual-value signal $x_i$ generated by the travel pickup 30 in FIG. 1 and forms therefrom the difference, i.e. the estimation error $\epsilon$ which via an evaluation circuit consisting of amplifiers 47, 48 and 49 furnishes correction signals which are supplied to the logic members 43 and 44 and change the input variables for the amplifier in such a manner that the estimation error $\epsilon$ tends to zero.

The estimated actual quantities for the acceleration $\hat{\ddot{x}}$ and the velocity $\hat{\dot{x}}$ of the tool are entered via lines 50 and 51 into the controller 35 which, taking additional account of the difference between the position actual value $x_i$ and the entered position desired value $x_w$ generates a manipulated variable on the line 52 which is supplied both to the servovalve 20 and to the logic member 43 for the model circuit. The feedback loops for the integrating amplifiers 40 and 41 for acceleration and velocity are designated by 53 and 54. If the gains of the amplifiers 47, 48, 49 of the evaluation circuit and of the feedback amplifiers 53 and 54 are optimized the actual quantities for the estimated acceleration and the estimated velocity of the tool will be large enough for the controller 35 to be able to generate a manipulated variable for the servovalve 20 which gives an actual value of the position of the tool which is equal to the estimated position $\hat{x}$ of the model circuit so that the estimation error $\epsilon$ tends to zero.

I claim:

1. In a machine tool comprising a tool driven in the axial direction by a piston of a hydraulic lifting cylinder and a directional valve for controlling the fluid paths between said cylinder, a fluid source and a reservoir for actuating said piston, characterized by a position pickup for electronically detecting the position of said piston, said directional valve comprising an electrically operated servovalve driven by a controller, said controller being programmed for processing the actual value of the piston position as sensed in said position sensor, a desired value for th piston position and a desired value for the duration and frequency of the stroke of piston for operating said servovalve to achieve said desired value of duration and frequency of piston stroke.

2. A machine tool according to claim 1, further including an acceleration pickup for detecting the acceleration or deceleration of the piston, said signal from said acceleration pickup being supplied to the controller.

3. A machine tool according to claim 1, characterized in that there is connected in parallel to the controlled system consisting of the servovalve and lifting cylinder an electrical model of the controlled system consisting of integrating amplifiers, a manipulated variable generated in the controller being supplied to said controlled system and said model, an error difference formed from the actual value of the piston position supplied by said position pickup and the estimated position of the model being supplied to an evaluation circuit whose correction signals are logically combined with the input signals to the integrating amplifiers, the output signals of the integrating amplifiers for acceleration and velocity each being applied to the controller and influencing the manipulated variable generated in response to the position actual value signal of the piston in the controller to maintain the error difference between desired value and actual value to about zero.

4. A machine tool according to claim 3, characterized in that the electrical model consists of three integrating amplifiers which from a third derivation of the position of the lifting cylinder determines the estimated acceleration the estimated velocity and from the extimated velocity the estimated position of the lifting cylinder are respectively determined by integration in the three integrating amplifiers.

5. A machine tool according to claim 3, characterized in that the evaluation circuit consists of amplifiers each associated with a respective one of the integrating amplifiers, the output signal of each evaluation system amplifier being logically combined with the input signal of the respective integrating amplifier.

6. A machine tool according to claim 1, characterized in that the controller is a proportional-integrating controller whose integrating constant is set so that the occurrence of limit oscillations are avoided.

7. A machine tool according to claim 1, characterized in that the servovalve is affixed relative to the lifting cylinder.

8. A machine tool according to claim 1, characterized in that the lifting cylinder has a traversing piston rod at the one end of which the tool is attached and at the other end of which the travel pickup is attached.

9. A machine tool according to claim 8, characterized in that the lifting cylinder piston rod and position are provided with low-friction substantially lead-free seals on their adjacent surfaces.

10. A machine tool according to claim 1, characterized in that the controller and the control electronic system are function units separate from each other.

* * * * *